UNITED STATES PATENT OFFICE.

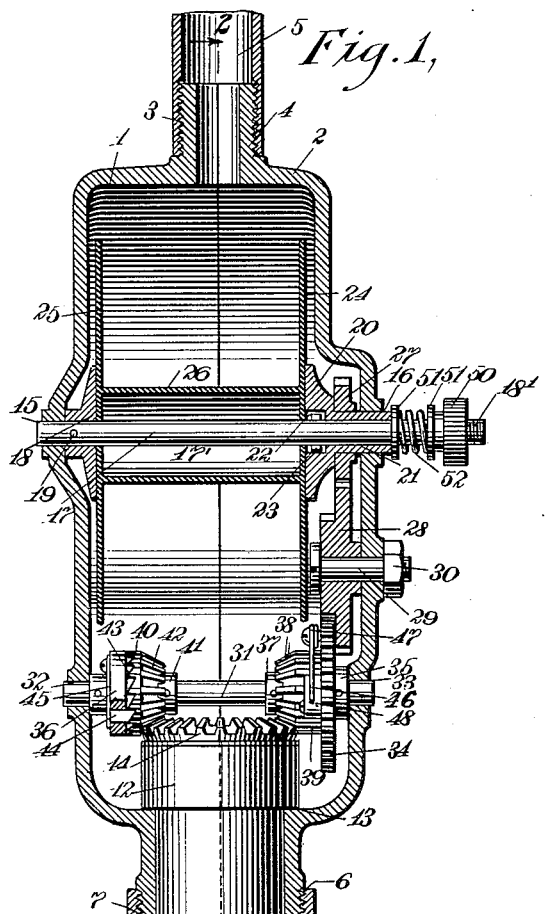

HARVEY HALL, OF PAONIA, COLORADO.

REEL.

1,007,443.    Specification of Letters Patent.   Patented Oct. 31, 1911.

Application filed February 10, 1911. Serial No. 607,748.

*To all whom it may concern:*

Be it known that I, HARVEY HALL, a citizen of the United States, and a resident of Paonia, in the county of Delta and State of Colorado, have invented a new and Improved Reel, of which the following is a full, clear, and exact description.

My invention relates generally to reels adapted to be applied to fishing rods, such as is the subject-matter of my Patent No. 977,732, and more particularly it relates to a reel having gearing therein coöperating with the reel proper and the handle, whereby successive turning of the handle in opposite directions will cause the line to wind up on the reel.

The object of the invention is to provide an improved form of reels to be used on fishing poles, the structure and arrangement being such that the line may be wound up on the reel proper by a rotary motion of the handle in either direction.

A further object of the invention is to provide an improved means, coöperating with the reel proper and the winding mechanism, whereby the winding mechanism may be thrown out of coöperative relation with the reel proper.

A further object of the invention is to provide an improved means in engagement with the reel proper and coöperating with the winding mechanism, whereby while the winding mechanism may be effectively operated to take up the line, the pressure between the reel proper and the winding mechanism may be varied, thereby providing for less slippage between the reel proper and the gearing or winding mechanism.

A further object of the invention is the provision of an improved friction means which may be applied to reels of the hereinbefore described type, which means permits the reel to be brought into inoperative position with respect to the winding mechanism, thereby providing for throwing out the line, the said means being also operable to bring the reel and the winding mechanism into coöperative relation, which will prevent more of the line being played out.

Reference is to be had to the accompanying drawings forming a part of this specification, in which like characters of reference denote corresponding parts in all the views, and in which—

Figure 1 is a longitudinal sectional view of the reel, the handle, and a portion of the pole; Fig. 2 is a partial sectional view, taken on the line 2—2 of Fig. 1, one side of the casing being removed; Fig. 3 is a partial sectional view showing the coöperating gearing members between the end of the rotatable handle and the gearing carried by the casing member.

The casing for my device is made up of side members 1, 2, having semi-cylindrical threaded parts 3, 4, for engagement with a socketed end 5 of a fishing pole; an opening 2' is provided between these members whereby access to the reel may be had. The opposite ends of the casing members 1 and 2 are screw threaded, as at 6 and 7, for engagement with a threaded ring 8, whereby the casing members are held in position. The handle member 9 having an outside portion 10, the end of the handle being inclosed by a cap member 11, has one end within the casing, this end being provided with an enlarged portion 12, engaging the inner walls 13 of the casing, whereby the handle is positioned, the portion 12 being provided with beveled teeth 14.

Extending transversely of the casing through openings 15 and 16 therein, is a shaft 17 having a portion extending without the casing and provided with a threaded end 18'; one end of the member 17, adjacent the casing member 1, is provided with a circular disk 18, held in position on the shaft 17 by means of the pin 19; the opposite end of the shaft 17 is provided with a disk 20 having a portion 21 extending therefrom and through the opening 16 in the casing, this member 20, at an approximately central portion, being provided with an oblong recess 22 engaging the pin 23 carried by the shaft 17. The reel proper is freely mounted on the shaft 17 between the disks 18 and 20 and is provided with circularly extending side members 24 and 25, together with the central portion 26 on which the line A is wound. Adjacent the casing member 2 and carried by the extending member 21, is a pinion 27 in engagement with a compound pinion 28 carried by the casing member 2 by means of the bolt 29 and nut 30, this pinion serving to transmit motion from the handle to the pinion 27. Adjacent the lower end of the casing members and extending therebetween is a second shaft 31 rotatably mounted in openings 32, 33, the right hand end of this shaft having secured thereon a pinion 34 having a sleeve portion 35 rigidly connected with this shaft; the left hand end of this shaft has rigidly secured thereon the circular smooth-faced member 36. Adjacent the pinion 34, and held in position by means of the collar 37 on the shaft 31, is a smaller pinion 38 having teeth 39 on its periphery, these teeth being extended to form beveled teeth adjacent the collar 37. The side of the pinion 34 adjacent the smaller pinion 38 is provided with a spring member 46 held in position by any suitable means, such as a screw 47, the extended end of this spring bearing against the free end of a dog 48 pivoted on one side of the pinion 34 which is adapted to engage the peripheral teeth of the pinion 38. At the left end of the shaft 31 and adjacent the member 36 is a pinion 40 held in position by means of the collar 41 on the shaft 31, this pinion being provided with beveled teeth 42, and one side portion being further provided with ratchet teeth 43 which lie closely adjacent one side of the member 36.

Referring particularly to Figs. 1 and 3, it will be noted that the member 36 is provided with an opening extending therethrough in which is seated a movable tooth 44, one end of which is in engagement with one of the ratchet teeth 43, this engagement being maintained by means of the leaf spring 45 carried on the rear side of the member 36. From Fig. 1 it will be noted that the pinion 42 is free to rotate in a clockwise rotation, such movement not affecting the shaft 31, and it will also be noted in the same figure that the pinion 38 is free to move in a counter-clockwise direction without moving the shaft 31. The beveled teeth 14 on the end of the handle 9 are constantly in engagement with the pinions 38 and 42, and in relation to the parts shown if the handle 9 is turned in alternative directions about its longitudinal axis, the shaft 31 will be rotated constantly in a counter-clockwise direction, as viewed from that side of the casing shown in the right side of the figure.

The reel proper 17' is freely rotatable on the shaft 17, and in order to throw the reel to operative position on the shaft whereby it may turn with the shaft, I have provided a thumb nut 50 on the threaded end 18' of this shaft and the washers 51, and a helical spring 52 on the shaft whereby, when the nut is tightened, the members 18 and 20 will be forced into close frictional contact with the sides 24 and 25 of the reel. By reason of the pin 23 in the shaft 17 engaging the recess 22 in the member 20, the shaft will always turn when the handle 9 is operated, by reason of the train of gearing between the end of the handle and the pinion 27 which is rigid with the member 20.

When it is desired to throw out a length of line from the reel 17' the thumb nut 50 is loosened, thereby relieving the pressure of the spring 52 against the end 21 of the member 20 which will relieve the reel 17' from close contact with both members 18 and 20, so that if the end of the line is thrown in any direction the line will play out, the reel being freely rotatable and the operating mechanism connected with the handle being not affected by such rotation.

When it is desired to wind the line A on the reel, the thumb nut 50 is tightened, thereby placing a spring 52 under compression and bringing the reel 17' into frictional engagement at each side thereof with the members 18 and 20; by then turning the handle 9 in alternative right and left directions, the line will be turned on the reel by reason of the train of gearing between the shaft 17 and the beveled teeth 14 on the end of the handle; by reason of the compact arrangement of the fixed pinions being in engagement with the teeth 14 on the end of the handle, the reel will always wind in the same direction no matter in which direction the handle is turned, either one of the movable pinions being idle as the case may be.

While I have shown the reel loosely mounted on the shaft and provided with a pinioning or braking means whereby it may be placed in operative position to turn with the shaft, the means for turning the shaft being that shown in the drawings, it is obvious that this particular means for turning the shaft may be omitted and a simple crank placed on the end of the shaft 17. In such a modified form of the invention, the nut 50 with the washers 51 and the spring 52 will be retained in the position shown in the drawings, but in order to hold the parts in proper position against turning when the nut 50 is turned to regulate the degree of frictional engagement, it will be necessary to provide some inter-engaging means, say on the inner side of the casing and one of the spool-shaped members, which inter-engaging means will permit the shaft and the reel to be freely turned in one direction when the crank is turned but will prevent the shaft and the parts thereon from turning when the nut 50 is brought from an idle position into operative position in order to bring the reel proper into engagement with the shaft.

From the above description it will be apparent that I have provided an improved reel whereby a fishing line may be quickly and efficiently wound, no time being lost in moving the handle, since turning of the handle in either direction will always effect the winding operation. By loosely mounting the reel on its shaft and providing the simple shaft, I have produced a device in which the line may be quickly thrown out by merely loosening the nut on the end of the shaft.

My device is capable of many modifications which affect the size, shape and form of the various elements, such changes, however, lying within the spirit of the invention as set forth in the appended claims.

Having thus described my invention, I claim as new, and desire to secure by Letters Patent:—

1. In a fishing reel, the combination of a casing provided with a shaft, a reel on the shaft, friction disks on the shaft, one of the disks being fixed thereto and the other being movable relatively thereto, a pinion carried by the said movable disk, means at the outer end of the shaft for bringing the said reel into close contact with each of the said disks whereby as the disk with the pinion thereon is turned, the said reel will also turn, together with means within the casing and operable by the oscillation of the handle of the reel whereby as the handle is operated the said means will actuate the said movable disk with the pinion thereon, the aforesaid means carried by the shaft being adjustable whereby as the said handle and means are operated the line may be wound on the reel.

2. In a fishing reel, the combination of a suitable casing, a shaft revolubly mounted in the casing, a reel carried on the shaft and adapted to freely turn thereon, friction disks carried by the shaft, one of the disks being fixed thereon, the said reel being mounted between the said disks, the other of the said disks being provided with a recess and the said shaft being provided with a pin engaging in the said recess whereby the shaft will turn with the disk, the recess and pin engagement permitting the disk to be moved longitudinally of the shaft during such turning, the said disk being also provided with a portion extending along the shaft and exterior of the casing, a pinion carried by the said extending portion, a gear carried by the casing, means engaging the gear for turning the pinion and with it the shaft, there being means on the shaft adjacent the said extending portion of the spool whereby the said disk may be brought into contact with the reel or released therefrom, thereby providing for turning the said reel with the said shaft.

3. In a fishing reel, the combination of a suitable casing, a shaft revolubly mounted in the casing, a reel carried on the shaft and adapted to freely turn thereon, members carried by the shaft on opposite sides of the end portions of the said reel, one of the said members being rigidly attached to the shaft, the other of the said members being movable there-along, the shaft and the said member being provided with co-acting means whereby turning of the member will turn the shaft, the said movement being also permitted by the said means, the said second member being also provided with a portion extending to the exterior of the casing, a pinion carried by the said extending portion, a gear carried by the casing, means engaging the gear for turning the pinion and with it the shaft, a spring member on the said end of the shaft exterior of the casing, a nut carried by the said end and adapted to bear against the said spring whereby the said second member may be brought into close contact with the said reel, thereby adapting the said reel to be turned with the said shaft, together with means for turning the said gear and the said pinion.

4. In a fishing reel, the combination of a suitable casing, a shaft revolubly mounted in the casing, a reel carried on the shaft and adapted to freely turn thereon, members carried by the shaft adjacent opposite ends of the said reel, one of the said members being rigidly attached to the said shaft, the other of the said members being provided with an elongated slot, the said shaft being provided with a transverse pin engaging in the said slot whereby turning of the said member will also turn the said shaft, the said member being provided with an extending portion having a pinion fixed thereon, the said extending portion being provided with a spring and nut whereby the said member having the extending portion may be brought into contact with the said reel, thereby adapting it to turn with the shaft or removing it from the said reel, thereby adapting the reel to turn freely on the shaft, a gear in engagement with the said pinion, a shaft within the casing having means engaging the said gear, pinions carried by the said shaft, means adjacent each pinion whereby, as the pinions are turned in opposite directions, the shaft will turn in a single direction, together with a handle having teeth at its end and in engagement with each of the said pinions whereby, as the handle is oscillated, the said gear will turn the said pinion on the said extending portion of the said member carried by the first-named shaft.

In testimony whereof I have signed this specification in the presence of two subscribing witnesses.

HARVEY HALL.

Witnesses:
LAURENCE J. GALLAGHER,
PHILIP D. ROLLHAUS.